United States Patent
Kurokawa

(10) Patent No.: US 11,520,306 B2
(45) Date of Patent: Dec. 6, 2022

(54) MACHINE LEARNING APPARATUS, CONTROLLER, GENERATION METHOD, AND CONTROL METHOD

(71) Applicant: FANUC CORPORATION, Yamanashi (JP)

(72) Inventor: Yuuki Kurokawa, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 207 days.

(21) Appl. No.: 17/014,680

(22) Filed: Sep. 8, 2020

(65) Prior Publication Data
US 2021/0080922 A1  Mar. 18, 2021

(30) Foreign Application Priority Data

Sep. 13, 2019 (JP) .............................. JP2019-167081

(51) Int. Cl.
| | | |
|---|---|---|
| G06F 19/00 | (2018.01) | |
| G05B 19/18 | (2006.01) | |
| G05B 19/404 | (2006.01) | |
| G06N 20/00 | (2019.01) | |
| G05B 19/418 | (2006.01) | |
| G05B 19/4093 | (2006.01) | |
| G06T 7/70 | (2017.01) | |

(52) U.S. Cl.
CPC ......... *G05B 19/182* (2013.01); *G05B 19/404* (2013.01); *G06N 20/00* (2019.01); *G05B 19/40932* (2013.01); *G05B 19/41875* (2013.01); *G05B 2219/45151* (2013.01); *G06T 7/70* (2017.01)

(58) Field of Classification Search
CPC ................ G05B 19/404; G05B 19/182; G05B 19/41875; G05B 19/40932; G06T 7/70; G06N 20/00
See application file for complete search history.

(56) References Cited

U.S. PATENT DOCUMENTS

| | | | |
|---|---|---|---|
| 2018/0067471 A1* | 3/2018 | Saitou | G05B 19/40932 |
| 2018/0101165 A1* | 4/2018 | Kurahashi | G05B 19/41875 |
| 2018/0272530 A1 | 9/2018 | Watanabe | |
| 2019/0080446 A1* | 3/2019 | Kuzmin | G06T 7/70 |
| 2020/0166909 A1* | 5/2020 | Noone | G06N 20/00 |

FOREIGN PATENT DOCUMENTS

JP     2018-161725 A     10/2018

* cited by examiner

*Primary Examiner* — Tuan A Vu
(74) *Attorney, Agent, or Firm* — Robert P. Michal, Esq.; Carter, DeLuca & Farrell LLP

(57) ABSTRACT

A machine learning apparatus includes a first information acquiring unit that acquires first information including at least one of a shape of a workpiece, a material of the workpiece, a cutting path of a cutting process, a type of a tool, and an amount of wear of the tool; a second information acquiring unit that acquires second information correlated with an evaluation of a burr occurring on the workpiece due to the cutting process; and a learning unit that executes learning processing using a plurality of pieces of the first information and a plurality of pieces of the second information, and generates a learning model that outputs a cutting condition, according to another piece of first information that is different from the plurality of pieces of first information.

8 Claims, 3 Drawing Sheets

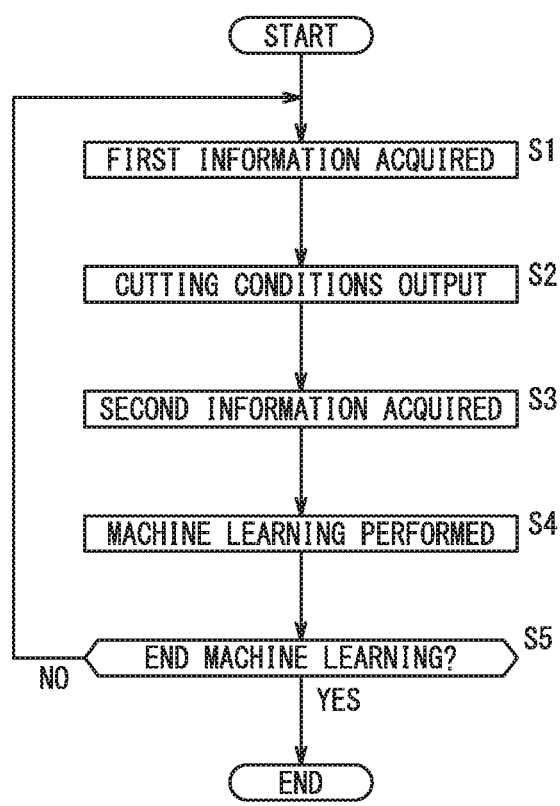

MACHINE LEARNING APPARATUS, CONTROLLER, GENERATION METHOD, AND CONTROL METHOD

CROSS-REFERENCE TO RELATED APPLICATION

This application is based upon and claims the benefit of priority from Japanese Patent Application No. 2019-167081 filed on Sep. 13, 2019, the contents of which are incorporated herein by reference.

BACKGROUND OF THE INVENTION

Field of the Invention

The present invention relates to a machine learning apparatus, a controller for controlling a processing machine body, a generation method for generating a learning model, and a control method for controlling the processing machine body.

Description of the Related Art

When performing a cutting process on a workpiece using a tool, burrs tend to occur on the workpiece due to the cutting process. Burrs are protrusions that protrude from the cutting surface of the workpiece.

Japanese Laid-Open Patent Publication No. 2018-161725 discloses a machine tool system that includes a machine tool and two robots that grip a workpiece, and states that, when the workpiece is gripped by one of the two robots, burrs occurring on the workpiece may be eliminated by the other of the two robots.

SUMMARY OF THE INVENTION

A tool for eliminating burrs tends to become worn out when the burrs occurring on the workpiece are eliminated, and the time needed for this elimination tends to become longer when there are more burrs. Therefore, there is a desire to reduce the burrs occurring on the workpiece. Therefore, it is an object of the present invention to provide a machine learning apparatus, a controller, a generation method, and a control method that can reduce the burrs occurring on a workpiece.

A first aspect of the present invention is
a machine learning apparatus that generates a learning model configured to estimate a cutting condition when performing a cutting process on a workpiece using a tool, the machine learning apparatus comprising:
a first information acquiring unit configured to acquire first information including at least one of a shape of the workpiece, a material of the workpiece, a cutting path of the cutting process, a type of the tool, and an amount of wear of the tool;
a second information acquiring unit configured to acquire second information correlated with an evaluation of a burr occurring on the workpiece due to the cutting process; and
a learning unit configured to execute learning processing using a plurality of pieces of the first information and a plurality of pieces of the second information, and generate a learning model configured to output the cutting condition, according to another piece of first information that is different from the plurality of pieces of first information.

A second aspect of the present invention is
a controller that controls a processing machine body that performs a cutting process on a workpiece using a tool, the controller comprising:
the machine learning apparatus described above; and
a control unit configured to control the processing machine body to realize the cutting condition corresponding to the other piece of first information, using the learning model generated by the machine learning apparatus.

A third aspect of the present invention is
a generation method for generating a learning model for estimating a cutting condition when performing a cutting process on a workpiece using a tool, the generation method comprising:
a first acquiring step of acquiring first information including at least one of a shape of the workpiece, a material of the workpiece, a cutting path of the cutting process, a type of the tool, and an amount of wear of the tool;
a second acquiring step of acquiring second information correlated with an evaluation of a burr occurring on the workpiece due to the cutting process; and
a learning step of executing learning processing using a plurality of pieces of the first information and a plurality of pieces of the second information, and generating a learning model configured to output the cutting condition, according to another piece of first information that is different from the plurality of pieces of first information.

A fourth aspect of the present invention is
a control method for controlling a processing machine body that performs a cutting process on a workpiece using a tool, the control method comprising;
the generation method described above; and
a control step of controlling the processing machine body to realize the cutting condition corresponding to the other piece of first information, using the learning model generated by the generation method.

According to the aspects of the present invention described above, it is possible to reduce the burrs occurring on the workpiece.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a flow chart showing a flow of the process performed by the machine learning apparatus.

DESCRIPTION OF THE PREFERRED EMBODIMENTS

Embodiments

Figure 1:
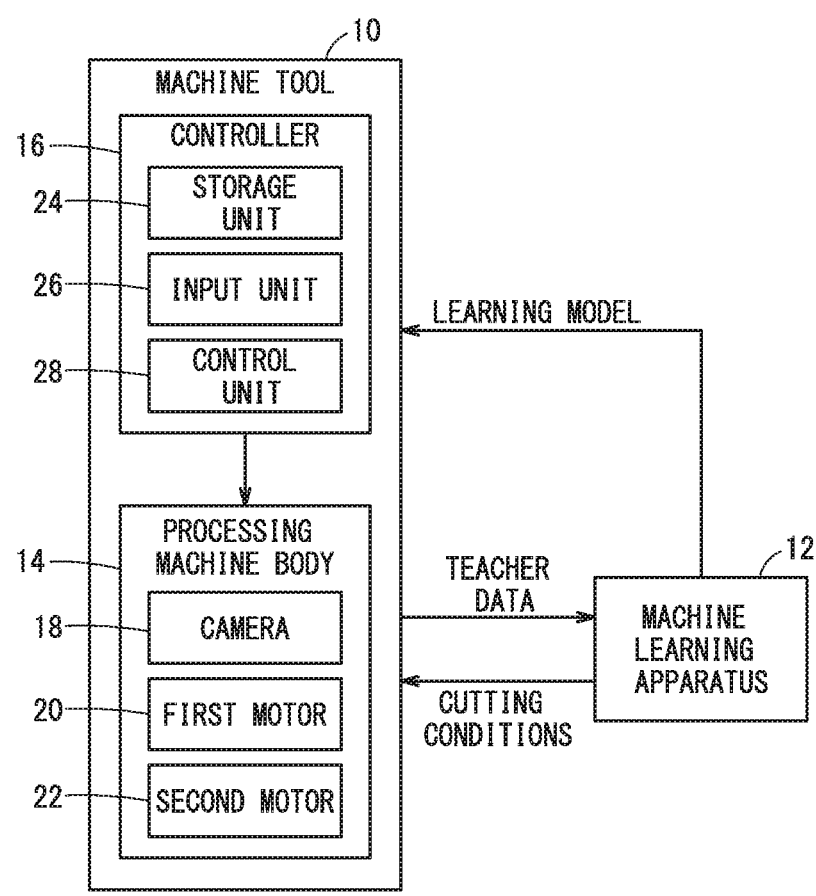
FIG. 1 is a block diagram showing a machine tool and a machine learning apparatus.

The following describes a system including a machine tool 10 and a machine learning apparatus 12 according to the present embodiment, with reference to FIG. 1.

The machine tool 10 includes a processing machine body 14 that cuts a workpiece using a tool, and a controller 16 that controls the processing machine body 14.

The processing machine body 14 includes a camera 18 that captures an image of the tool and the workpiece, a first motor 20 that rotates a spindle to which the tool is attached, and a second motor 22 that moves the spindle relative to the workpiece. The second motor 22 includes an X-axis motor, a Y-axis motor, and a Z-axis motor. The Z-axis is an axis extending in a direction in which the tool moves toward or away from the workpiece, and the X-axis and Y-axis are axes that are orthogonal to the Z-axis and also orthogonal to each other in a plane.

The controller 16 includes a storage unit 24 in which a cutting program and the like are stored, an input unit 26 for inputting information, and a control unit 28 that controls the processing machine body 14. The control unit 28 executes a first mode or a second mode, according to a designation from the machine learning apparatus 12, for example.

The control unit 28 controls the first motor 20 and the second motor 22 in the first mode, using the cutting program stored in the storage unit 24 and cutting conditions output from the machine learning apparatus 12.

The cutting conditions include the rotational speed of the tool, the feedrate of the tool, and the cutting depth of the tool for the workpiece. Specifically, the control unit 28 controls the first motor 20 such that the spindle rotates according to the rotational speed of the tool. Furthermore, the control unit 28 controls the second motor 22 (at least one of the X-axis motor and the Y-axis motor) such that the spindle moves relative to the workpiece according to the feedrate of the tool. Yet further, the control unit 28 controls the second motor 22 (Z-axis motor) such that the spindle moves relative to the workpiece according to the cutting depth of the tool. For cutting conditions other than the cutting conditions output from the machine learning apparatus 12, the control unit 28 uses setting values that are set in advance as defaults.

In the second mode, the control unit 28 estimates cutting conditions that will reduce the burrs, using the learning model output from the machine learning apparatus 12, and controls the first motor 20 and the second motor 22 using these estimated cutting conditions and the cutting program stored in the storage unit 24. For cutting conditions other than the cutting conditions estimated using the learning model, the control unit 28 uses setting values that are set in advance as defaults.

The machine learning apparatus 12 inputs information concerning the state of the machine tool 10 as teacher data, performs machine learning with a teacher based on the input teacher data, and generates a learning model. Upon generating the learning model, the machine learning apparatus 12 outputs the generated learning model to the controller 16.

Figure 2:
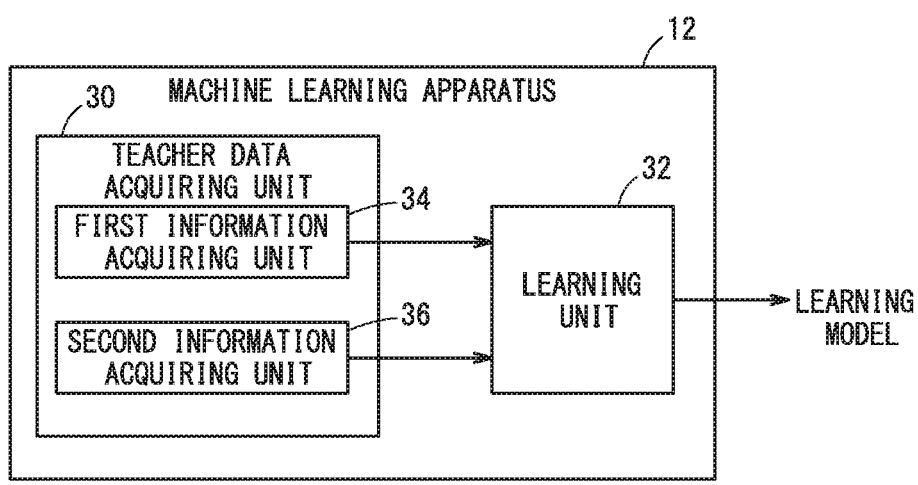
FIG. 2 is a block diagram showing a configuration of the machine learning apparatus.

The following describes the machine learning apparatus 12 in greater detail, using FIGS. 2 and 3. The machine learning apparatus 12 includes a teacher data acquiring unit 30 and a learning unit 32. The teacher data acquiring unit 30 includes a first information acquiring unit 34 and a second information acquiring unit 36.

The processing of the machine learning apparatus 12 is executed in accordance with the flow chart shown in FIG. 3. At step S1, the first information acquiring unit 34 acquires the shape of the workpiece, the material of the workpiece, the cutting path of the cutting process, the type of tool, and the amount of wear of the tool from the machine tool 10, as the first information.

The first information acquiring unit 34 may acquire the shape of the workpiece and the material of the workpiece by making a request to the machine tool 10 for the shape of the workpiece and the material of the workpiece stored in the storage unit 24. The first information acquiring unit 34 may acquire the cutting path of the cutting process and the type of tool by making a request to the machine tool 10 for the cutting program stored in the storage unit 24 and analyzing the cutting program output from the machine tool 10 in response to this request. The first information acquiring unit 34 may acquire the amount of wear of the tool by making a request to the machine tool 10 for image capturing of the tool and performing an image analysis on the image of the tool output from the machine tool 10 in response to this request and model images of the tools held in advance.

When the first information acquiring unit 34 acquires the first information from the machine tool 10, the processing of the machine learning apparatus 12 moves to step S2.

At step S2, the learning unit 32 uses a prescribed machine learning algorithm to set cutting conditions corresponding to the first information acquired at step S1. Specific examples of such a machine learning algorithm include a convolutional neural network, Long Short-Term memory, recurrent neural network, and multilayer perceptron. The machine learning algorithm is not limited to these specific examples, and it is only necessary to adopt a regression method.

When the cutting conditions are set, the learning unit 32 causes the machine tool 10 to execute the cutting process based on these cutting conditions, by outputting the set cutting conditions to the machine tool 10.

When the learning unit 32 outputs the cutting conditions to the machine tool 10, the processing of the machine learning apparatus 12 moves to step S3.

At step S3, the second information acquiring unit 36 acquires second information correlated with an evaluation of burrs that have occurred on the workpiece due to the cutting process, from the machine tool 10. The cutting process is executed based on the cutting conditions output to the machine tool 10 at step S2. The second information acquiring unit 36 acquires the burr surface area, the burr root portion length, the burr height from the cutting surface, and the cutting process cycle time, as the second information. The burr surface area, the burr root portion length, and the burr height from the cutting surface are the surface area, root portion length, and height of the portion protruding from the cutting surface in the planar view (the portion protruding from the cutting surface in the image captured by the camera 18).

The second information acquiring unit 36 may acquire the burr surface area, the burr root portion length, and the burr height from the cutting surface by making a request to the machine tool 10 for image capturing of the workpiece when the cutting process was performed and performing an image analysis on the image of the workpiece output from the machine tool 10 in response to this request. The second information acquiring unit 36 may acquire the cutting process cycle time as measured by the machine tool 10, by making a request for measurement of the cutting process cycle time. If the cutting process cycle time is set in the machine tool 10, the second information acquiring unit 36 may acquire the cutting process cycle time by making a request to the machine tool 10 for the cutting process cycle time stored in the storage unit 24.

When the second information acquiring unit 36 acquires the second information from the machine tool 10, the processing of the machine learning apparatus 12 moves to step S4.

At step S4, the learning unit 32 generates the learning model by updating the learning model from the first information acquired at step S1 and the second information acquired at step S3, using the prescribed machine learning algorithm. For example, in the case of Q-learning that uses a so-called Q-learning algorithm, a function expressing the value of a cutting condition for the current state (first information) is updated using a reward. In this case, a reward corresponding to the burr surface area, the burr root portion length, the burr height from the cutting surface, and the cutting process cycle time in the second information is provided. As the Q-learning progresses, the function is updated toward selecting cutting conditions that can provide a higher reward. This function itself may be a learning model, and a database in which the first information, the cutting conditions, and the reward are associated with a prescribed numerical value may be the learning model. When the learning unit 32 generates the learning model, the processing of the machine learning apparatus 12 moves to step S5.

At step S5, the learning unit 32 judges whether to end the machine learning. Here, if a prescribed condition such as a predetermined number of repetitions is not satisfied, the learning unit 32 judges that the machine learning is not to be ended. In this case, the machine learning apparatus 12 returns to step S1. On the other hand, if the prescribed condition is satisfied, the learning unit 32 judges that the machine learning is to be ended. In this case, the processing of the machine learning apparatus 12 ends.

With this configuration, the machine learning apparatus 12 can generate a learning model that takes into account the correlation relationship between the cutting conditions that can reduce the burrs and the state of the machine tool 10 (first information and second information) including the tool, the workpiece, and the cycle time, by repeatedly executing the processing at steps S1 to S5. In other words, even though the correlation relationship between the cutting conditions that can reduce the burrs and the state of the machine tool 10 is unknown when the processing of the machine learning apparatus 12 starts, this correlation relationship can be identified by increasing the frequency at which steps S1 to S5 described above are repeatedly executed.

Accordingly, the machine tool 10 can acquire the optimal cutting conditions corresponding to the current first information by using the learning model generated by the machine learning apparatus 12, and can reduce the burrs by controlling the processing machine body 14 in a manner to realize the acquired cutting conditions.

Modifications

The machine learning apparatus 12 acquires the first information and the second information from the machine tool 10 in the embodiment described above. Instead, the machine learning apparatus 12 may acquire the first information and the second information from an apparatus other than the machine tool 10, such as a simulation apparatus, for example.

Furthermore, the machine learning apparatus 12 acquires the first information and the second information from a single machine tool 10 in the embodiment described above. Instead, the machine learning apparatus 12 may acquire the first information and the second information from a plurality of machine tools 10 via a network.

The machine learning apparatus 12 is provided outside the machine tool 10 in the embodiment described above. Instead, the machine learning apparatus 12 may be provided inside the machine tool 10. In other words, the machine learning apparatus 12 may be incorporated in the controller 16 that controls the processing machine body 14.

The machine learning apparatus 12 acquires the shape of the workpiece, the material of the workpiece, the cutting path of the cutting process, the type of tool, and the amount of wear of the tool, as the first information in the embodiment described above. Instead, the machine learning apparatus 12 may acquire a portion of the shape of the workpiece, the material of the workpiece, the cutting path of the cutting process, the type of tool, and the amount of wear of the tool, as the first information. Alternatively, the machine learning apparatus 12 may acquire, as the first information, at least one of the shape of the workpiece, the material of the workpiece, the cutting path of the cutting process, the type of tool, and the amount of wear of the tool, and a parameter other than the shape of the workpiece, the material of the workpiece, the cutting path of the cutting process, the type of tool, and the amount of wear of the tool.

The machine learning apparatus 12 acquires the burr surface area, the burr root portion length, the burr height from the cutting surface, and the cutting process cycle time, as the second information in the embodiment described above. Instead, the machine learning apparatus 12 may acquire a portion of the burr surface area, the burr root portion length, the burr height from the cutting surface, and the cutting process cycle time, as the second information. Alternatively, the machine learning apparatus 12 may acquire, as the second information, at least one of the burr surface area, the burr root portion length, the burr height from the cutting surface, and the cutting process cycle time, and a parameter other than the burr surface area, the burr root portion length, the burr height from the cutting surface, and the cutting process cycle time. The camera 18 is used to acquire the burr surface area, the burr root portion length, and the burr height from the cutting surface, but a laser measuring device may be used instead of or in addition to the camera 18.

The machine learning apparatus 12 generates the learning model that outputs the rotational speed of the tool, the feedrate of the tool, and the cutting depth of the tool for the workpiece as the cutting conditions, according to the first information in the embodiment described above. Instead, the cutting conditions may be a portion of the rotational speed of the tool, the feedrate of the tool, and the cutting depth of the tool for the workpiece. Alternatively, the cutting conditions may be at least one of the rotational speed of the tool, the feedrate of the tool, and the cutting depth of the tool for the workpiece, and a parameter other than the rotational speed of the tool, the feedrate of the tool, and the cutting depth of the tool for the workpiece. Furthermore, the cutting conditions may be a parameter that is other than the rotational speed of the tool, the feedrate of the tool, and the cutting depth of the tool for the workpiece and that is acquired as the second information.

Technical Concepts

The followings are first to fourth inventions that are technical concepts that can be understood from the embodiment and modifications described above.

First Invention

The first invention is a machine learning apparatus (12) that generates a learning model configured to estimate a cutting condition when performing a cutting process on a workpiece using a tool, the machine learning apparatus comprising:

a first information acquiring unit (34) configured to acquire first information including at least one of a shape of the workpiece, a material of the workpiece, a cutting path of the cutting process, a type of the tool, and an amount of wear of the tool;

a second information acquiring unit (36) configured to acquire second information correlated with an evaluation of a burr occurring on the workpiece due to the cutting process; and a learning unit (32) configured to execute learning processing using a plurality of pieces of the first information and a plurality of pieces of the second information, and generate a learning model configured to output the cutting condition, according to another piece of first information that is different from the plurality of pieces of first information.

With this configuration, it is possible to generate a learning model that takes into consideration the correlation relationship between the states of the tool and the workpiece (first information and second information) and the cutting conditions that can reduce the burrs, and therefore it is possible to reduce the burrs occurring on the workpiece.

The cutting condition may include at least one of a feedrate of the tool, a rotational speed of the tool, and a cutting depth of the tool for the workpiece. With this configuration, it is possible to reduce the burrs occurring on the workpiece.

The second information may include at least one of a surface area of the burr, a length of a root portion of the burr, a height of the burr from a cutting surface, and a cycle time of the cutting process. With this configuration, it is possible to take the correlation relationship between the states of the tool and the workpiece (first information and second information) and the cutting conditions that can reduce the burrs into consideration in greater detail.

The second information may include the cycle time of the cutting process, and at least one of the surface area of the burr, the length of the root portion of the burr, and the height of the burr from the cutting surface. With this configuration, it is possible to take the correlation relationship between the states of the tool and the workpiece (first information and second information) and the cutting conditions that can reduce the burrs into consideration in greater detail.

Second Invention

The second invention is a controller (16) that controls a processing machine body (14) that performs a cutting process on a workpiece using a tool, the controller comprising:

the machine learning apparatus (12) described above; and a control unit (28) configured to control the processing machine body (14) to realize the cutting condition corresponding to the other piece of first information, using the learning model generated by the machine learning apparatus (12) described above.

By controlling the processing machine body (14) using the learning model that takes into consideration the correlation relationship between the states of the tool and the workpiece (first information and second information) and the cutting conditions that can reduce the burrs, it is possible to reduce the burrs occurring on the workpiece.

Third Invention

The third invention is
a generation method for generating a learning model for estimating a cutting condition when performing a cutting process on a workpiece using a tool, the generation method comprising:

a first acquiring step (S1) of acquiring first information including at least one of a shape of the workpiece, a material of the workpiece, a cutting path of the cutting process, a type of the tool, and an amount of wear of the tool;

a second acquiring step (S3) of acquiring second information correlated with an evaluation of a burr occurring on the workpiece due to the cutting process; and a learning step (S4) of executing learning processing using a plurality of pieces of the first information and a plurality of pieces of the second information, and generating a learning model configured to output the cutting condition, according to another piece of first information that is different from the plurality of pieces of first information.

With this configuration, it is possible to generate a learning model that takes into consideration the correlation relationship between the states of the tool and the workpiece (first information and second information) and the cutting conditions that can reduce the burrs, and therefore it is possible to reduce the burrs occurring on the workpiece.

The cutting condition may include at least one of a feedrate of the tool, a rotational speed of the tool, and a cutting depth of the tool for the workpiece. With this configuration, it is possible to reduce the burrs occurring on the workpiece.

The second information may include at least one of a surface area of the burr, a length of a root portion of the burr, a height of the burr from a cutting surface, and a cycle time of the cutting process. With this configuration, it is possible to take the correlation relationship between the states of the tool and the workpiece (first information and second information) and the cutting conditions that can reduce the burrs into consideration in greater detail.

The second information may include the cycle time of the cutting process, and at least one of the surface area of the burr, the length of the root portion of the burr, and the height of the burr from the cutting surface. With this configuration, it is possible to take the correlation relationship between the states of the tool and the workpiece (first information and second information) and the cutting conditions that can reduce the burrs into consideration in greater detail.

Fourth Invention

The fourth invention is
a control method for controlling a processing machine body (14) that performs a cutting process on a workpiece using a tool, the control method comprising:

the generation method described above; and a control step of controlling the processing machine body (14) to realize the cutting condition corresponding to the other piece of first information, using the learning model generated by the generation method.

By controlling the processing machine body (14) using the learning model that takes into consideration the correlation relationship between the states of the tool and the workpiece (first information and second information) and the cutting conditions that can reduce the burrs, it is possible to reduce the burrs occurring on the workpiece.

What is claimed is:

1. A machine learning apparatus that generates a learning model configured to estimate a cutting condition for a processing machine body when performing a cutting process on a workpiece using a tool and to reduce burrs occurring on the workpiece, the machine learning apparatus comprising:

a first information acquiring unit configured to acquire first information including at least one of a shape of the workpiece, a material of the workpiece, a cutting path of the cutting process, a type of the tool, and an amount of wear of the tool;

a second information acquiring unit configured to acquire second information including a state of the burr formed on the workpiece due to the cutting process under the cutting condition set by the machine learning apparatus using the first information; and a learning unit configured to repeatedly execute learning processing every time the first information and the second information are acquired, and adjust, based on a plurality of pieces of the first information and a plurality of pieces of the second information, at least one of a rotational speed of the tool, a feedrate of the tool, or a cutting depth of the tool as the cutting condition for reducing the burr formed on the workpiece due to the cutting process.

2. The machine learning apparatus according to claim 1, wherein the state of the burr includes at least one of a surface area of the burr, a length of a root portion of the burr, or a height of the burr from a cutting surface.

3. The machine learning apparatus according to claim 2, wherein the second information further includes a cycle time of the cutting process.

4. A controller that controls a processing machine body that performs a cutting process on a workpiece using a tool, the controller comprising:

the machine learning apparatus according to claim 1; and a control unit configured to control the processing machine body to realize the cutting condition corresponding to the other piece of first information, using the learning model generated by the machine learning apparatus.

5. A generation method for generating a learning model for estimating a cutting condition for a processing machine body when performing a cutting process on a workpiece using a tool and to reduce burrs occurring on the workpiece, the generation method comprising:

a first acquiring step of acquiring first information including at least one of a shape of the workpiece, a material of the workpiece, a cutting path of the cutting process, a type of the tool, and an amount of wear of the tool;

a second acquiring step of acquiring second information including a state of the burr formed on the workpiece due to the cutting process under the cutting condition set by the machine learning apparatus using the first information; and a learning step of repeatedly executing learning processing every time the first information and the second information are acquired, and adjust, based on a plurality of pieces of the first information and a plurality of pieces of the second information, at least one of a rotational speed of the tool, a feedrate of the tool, or a cutting depth of the tool as the cutting condition for reducing the burr formed on the workpiece due to the cutting process.

6. The generation method according to claim 5, wherein the state of the burr includes at least one of a surface area of the burr, a length of a root portion of the burr, or a height of the burr from a cutting surface.

7. The generation method according to claim 6, wherein the second information further includes a cycle time of the cutting process.

8. A control method for controlling a processing machine body that performs a cutting process on a workpiece using a tool, the control method comprising:

the generation method according to claim 5; and a control step of controlling the processing machine body to realize the cutting condition corresponding to the other piece of first information, using the learning model generated by the generation method.

\* \* \* \* \*